United States Patent [19]

Nishiide et al.

[11] Patent Number: 5,071,498

[45] Date of Patent: Dec. 10, 1991

[54] METHOD OF BENDING BACK TIRE COMPONENT AND APPARATUS FOR SAID BENDING-BACK

[75] Inventors: Seiichiro Nishiide, Tokyo; Masato Sueyasu, Saitama; Takeshi Yonezawa, Yamaguchi; Masaharu Sumiuchi, Tokyo; Hiroshi Ogawa, Yamaguchi, all of Japan

[73] Assignee: Bridgestone Corporation, Tokyo, Japan

[21] Appl. No.: 449,027

[22] Filed: Dec. 11, 1989

[30] Foreign Application Priority Data

Apr. 25, 1989 [JP] Japan .................................. 1-105559

[51] Int. Cl.$^5$ .............................................. B29D 30/32
[52] U.S. Cl. .................................... 156/132; 156/401
[58] Field of Search ..................... 156/132, 401, 403

[56] References Cited

U.S. PATENT DOCUMENTS 3,776,793  12/1973  Frazier ............................... 156/132
4,830,693   5/1989  Okafuji et al. ...................... 156/132

Primary Examiner—Michael W. Ball
Assistant Examiner—Francis J. Lorin
Attorney, Agent, or Firm—Sughrue, Mion, Zinn, Macpeak & Seas

[57] ABSTRACT

A method of bending back a tire component, comprising a step in which the diameters of a pair of cylindrical bodies, whose diameters can be increased and decreased, are decreased to a minimum value to hold beads by the bodies, respectively, and the beads are set in prescribed positions on the component wound on a forming drum; a step in which the diameters of the bodies are increased to an intermediate value and the bladders of the drum are inflated so that the component is pinch-held at both side edges thereof by the bladders and the bodies; a step in which the bodies are moved to positions located nearly outside the beads in the radial directions of the bodies, so that both the side edges of the component are moved outward in the radial directions of the bodies as the component remains in pressure contact with the beads near the side edges; and a step in which the diameters of the bodies are increased to a maximum value and the bodies are thereafter moved toward the longitudinally central portion of the drum so that the component is bent back at both the side edges thereof around the beads by the bodies, the bladders and the body of the drum.

6 Claims, 5 Drawing Sheets

METHOD OF BENDING BACK TIRE COMPONENT AND APPARATUS FOR SAID BENDING-BACK

BACKGROUND OF THE INVENTION

The present invention relates to a method in which a tire component wound on a forming drum is bent back at both the side edges of the tire component around beads. The present invention also relates to an apparatus for that bending-back.

A conventional method of bending back a tire component and a conventional apparatus for that bending-back were disclosed in the Japanese Patent Application (OPI) No. 130834/87 (the term "OPI" as used herein means an "unexamined published application"). To bend back the tire component in the method or by the apparatus, the diameters of a pair of cylindrical bodies, whose diameters can be increased and decreased, are first decreased to a minimum value so that the beads of a tire to be manufactured are held by the cylindrical bodies. The beads are then set in prescribed positions on the tire component wound on a forming drum. After that, the diameters of the cylindrical bodies are increased to a maximum value and the bladders of the forming drum are inflated so that the tire component is pinch-held at both the side edges thereof by the bladders and the cylindrical bodies. The cylindrical bodies are then moved toward the longitudinally central portion of the forming drum as the tire component remains pinch-held at both the side edges thereof by the bladders and the cylindrical bodies, so that the tire component is bent back at both the side edges thereof around the beads by the cylindrical bodies, the bladders and the body of the forming drum. At that time, the maximum inside diameter of each of the cylindrical bodies needs to be equal to the sum of the outside diameter of the tire component and the double of the radial thickness of the space into which the bladder is pushed between the tire component and the cylindrical body as the bladder is inflated.

If the length of each bent-back portion of the tire component, which is equal to the distance from the position of the set bead to the nearby side edge of the tire component, is larger than the radial thickness of the space, the tire component can be securely pinch-held by the cylindrical bodies and the bladders to bend back the tire component at both the side edges thereof around the beads while keeping the bent-back portions of the tire component in strong pressure contact with the beads, to make the quality of the bending-back high. However, if the length of each bent-back portion of the tire component is smaller than the radial thickness of the space, the tire component cannot be securely pinch-held at both the side edges thereof by the cylindrical bodies and the bladders but the bent-back portion is likely to be simply pushed onto the bead by the bladder to make it impossible to always securely bend back the tire component at the side edges thereof to render the quality of the bending-back thereof good. This is a problem.

SUMMARY OF THE INVENTION

The present invention was made in order to solve the problem.

Accordingly, it is an object of the present invention to provide a method of bending back a tire component so as to make the quality of the bending-back thereof high even if the length of each bent-back portion of the tire component is relatively small. The method is characterized by including step in which the diameters of a pair of cylindrical bodies, whose diameters can be increased and decreased, are decreased to a minimum value to hold beads by the cylindrical bodies, respectively, and the beads are set in prescribed positions on the tire component wound on a forming drum; a step in which the diameters of the cylindrical bodies are increased to an intermediate value and the bladders of the forming drum are inflated so that the tire component is pinch-held at both the side edges thereof by the bladders and the cylindrical bodies; a step in which the cylindrical bodies are moved to positions located nearly outside the beads in the radial directions of the cylindrical bodies, so that both the side edges of the tire component are moved outward in the radial directions of the cylindrical bodies as the tire component remains in pressure contact with the beads near both the side edges of the component; and a step in which the diameters of the cylindrical bodies are increased to a maximum value and the bodies are thereafter moved toward the longitudinally central portion of the forming drum so that the tire component is bent back at both the side edges thereof around the beads by the cylindrical bodies, the bladders and the body of the drum.

It is another object of the present invention to provide and apparatus for bending back a tire component so as to make the quality of the bending-back thereof high even if the length of each bent-back portion of the tire component is relatively small. The apparatus includes a pair of cylindrical bodies, each of which includes a plurality of arc-shaped segments and has holding portions which are located at the mutually-opposed longitudinally inner ends of the cylindrical bodies and can hold beads; diameter increase/decrease mechanisms which move the arc-shaped segments synchronously with each other in the radial directions of the cylindrical bodies so that the diameters of the bodies are increased or decreased; maximum diameter stoppers for restricting the outward movement of the segments in the radial directions of the cylindrical bodies so as to limit the diameters of the bodies to a maximum value; minimum diameter stoppers for restricting the inward movement of the segments in the radial directions of the cylindrical bodies so as to limit the diameters of the bodies to a minimum value; a drive mechanism for moving the cylindrical bodies in the axial direction of a forming drum; and bladders provided at both the longitudinal ends of the forming drum and capable of being inflated and deflated. The apparatus is characterized in that intermediate diameter stoppers are provided to restrict the outward movement of the arc-shaped segments in the radial directions of the cylindrical bodies so as to limit the diameters of the bodies to an intermediate value between the maximum and the minimum values; and moving mechanisms are provided to move the intermediate diameter stoppers between restrictive positions for restricting the movement of the segments, and put-aside positions for not restricting the movement of the segments.

As for each of the method and the apparatus, the arc-shaped segments are moved synchronously with each other inward in the radial directions of the cylindrical bodies by the diameter increase/decreased mechanisms until the movement of the segments in hindered by the minimum diameter stopper; The diameters of the cylindrical bodies are thus decreased to the minimum value. After the beads are then held by the holding portions of the cylindrical bodies, the beads are set in the prescribed positions on the tire component wound on the forming drum. The intermediate diameter stoppers are then moved from the put-aside positions to the restrictive positions by the moving mechanisms. The arc-shaped segments are thereafter moved outward in the radial directions of the cylindrical bodies by the diameter increase/decrease mechanisms until the movement of the segments in hindered by the intermediate diameter stoppers. The diameters of the cylindrical bodies are thus increased to the intermediate value. At that time, the bladders are inflated. Since the diameters of the cylindrical bodies are increased to the intermediate value smaller than the maximum value, the tire component is securely pinch-held at both the side edges thereof between the cylindrical bodies and the inflated bladders even if the length of each of the portions of the tire component, which extend from the set poisons of the beads to the side edges of the tire component, is relatively small. The cylindrical bodies are then moved toward each other in the axial direction thereof by the drive mechanism as the tire component remains pinch-held at both the side edges thereof between the cylindrical bodies and the inflated bladders, so that the cylindrical bodies are put into positions located nearly outside the beads in the radial directions of the bodies. As a result, the tire component is bent at both the side edges thereof outward in the radial directions of the cylindrical bodies as the component remains in strong pressure contact with the beads, so that the quality of the bending-back of the portions of the tire component is made high. The intermediate diameter stoppers are then moved from the restrictive positions to the put-aside positions by the moving mechanisms so that the hindrance of the movement of the arc-shaped segments by the stoppers is ceased. The arc-shaped segments are then moved outward in the radial directions of the cylindrical bodies by the diameter increase/decrease mechanisms until the movement of the segments is hindered by the maximum diameter stoppers. The diameters of the cylindrical bodies are thus increased to the maximum value so that spaces, into which the bladders are moved, are defined between the tire component and the cylindrical bodies. At that time, both the side edges of the tire component are released out from between the cylindrical bodies and the bladders, but the bent portion of the tire component remain pushed onto the beads by the bladders, so that the bent states of the portions are not changed. The cylindrical bodies are thereafter moved toward the longitudinally central portions of the forming drum by the drive mechanism. As a result, the bladders are deformed into the spaces between the cylindrical bodies and the tire component so that the tire component is bent back at both the side edges thereof around the beads by the cylindrical bodies, the bladders and the body of the forming drums. The quality of the bending-back of the portions of the tire component is thus made high even if the length of each of the portions is relatively small.

DETAILED DESCRIPTION OF EXEMPLARY EMBODIMENTS

Embodiments of the present invention are hereafter described in detail with reference to the drawings attached hereto. One of the embodiments is a method of bending back a tire component. The other of the embodiments is an apparatus for bending back the tire component.

Figure 1:
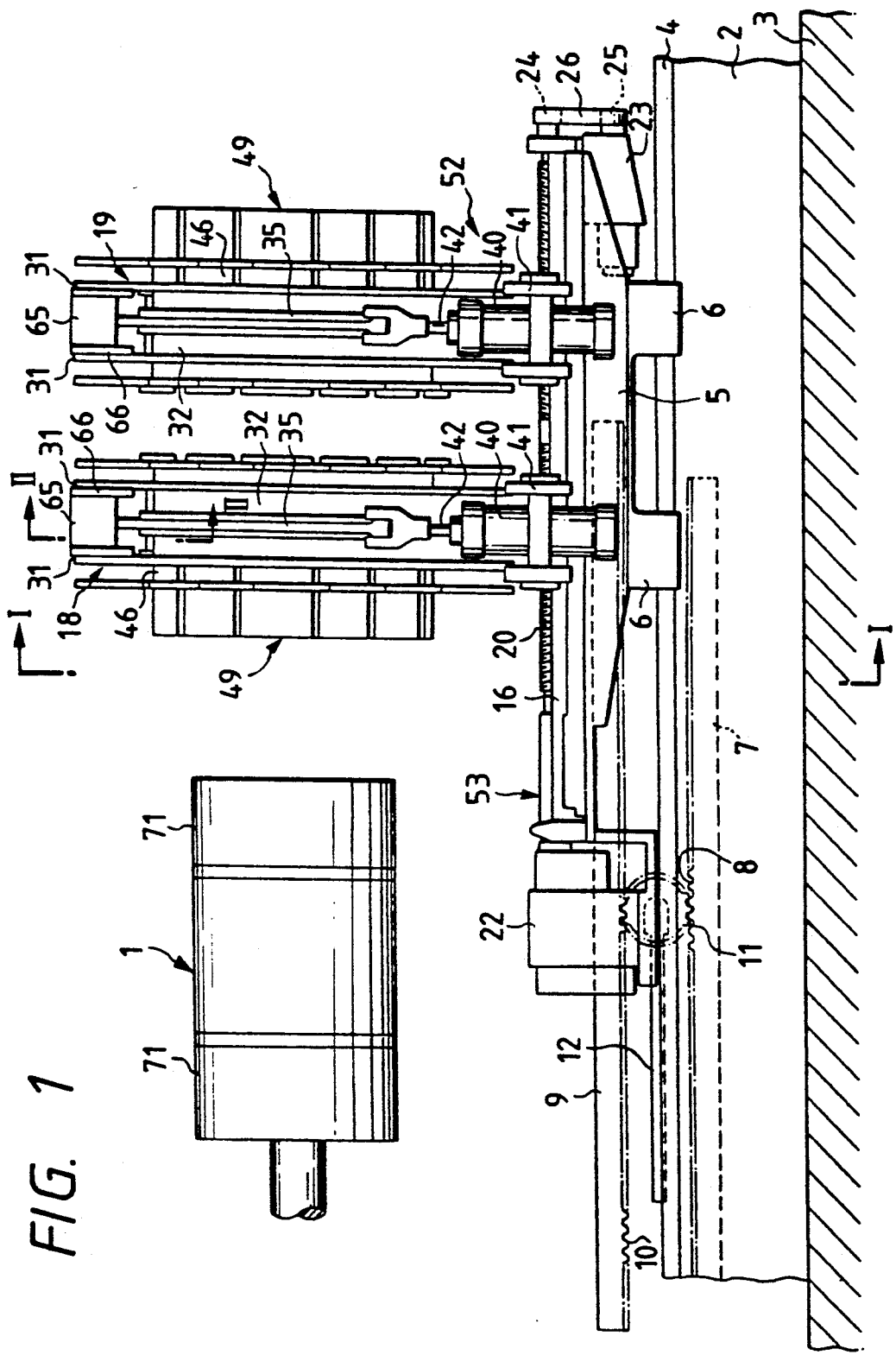
FIG. 1 is a front view of an apparatus which is an embodiment of the present invention and is for bending back a tire component.

In FIGS. 1. and 2., a reference numeral 1 designates a forming drum for performing the first-stage formation of a radial tire, the component of which is bent back by the apparatus in the method. The forming drum 1 can be rotated about a horizontal axis, and be increased and decreased in diameter. A bed 2 is provided on a floor 3. Rails 4 are laid on the bead 2 in parallel with the axis of the forming drum 1. A movable frame 5 can be moved along the rails 4, and is provided with linear slide bearings 6 slidably supported on the rails 4. A lower rack 7 is secured to the bed 2 in parallel with the rails 4, and has teeth 8 at the upside of the rack. An upper rack 9 is secured to the movable frame 5 in parallel with the lower rack 7, and has teeth 10 at the downside of the upper rack. A pinion 11 is engaged with the lower rack 7 and the upper rack 9 between them, and coupled to the tip of the piston rod 12 of a cylinder not shown in the drawings. When the cylinder is put in action, the movable frame 5 is moved in parallel with the axis of the forming drum 1, at a speed twice higher than that of the piston rod 12, while the frame is being guided by the rails 4. Rails 16 are laid on the movable frame 5 in parallel with the rails 4. A pair of stands 18 and 19 are movable supported with linear slide bearings 17. A screw shaft 20 is rotatably supported by the movable frame 5, and extends in parallel with the rails 16. Both the half portions of the screw shaft 20 have screw threads reverse to each other in the direction of spirality and engaged with screw blocks 21 provided on the stands 18 and 19, so that the stands are moved toward or away from each other by the same length as each other in parallel with the axis of the forming drum when the screw shaft is rotated by a motor 22. The rotational frequency of the screw shaft 20 is detected by an encoder 23 through pulleys 24 and 25 and a belt 26 to control the operation of the motor 22.

Figure 2:
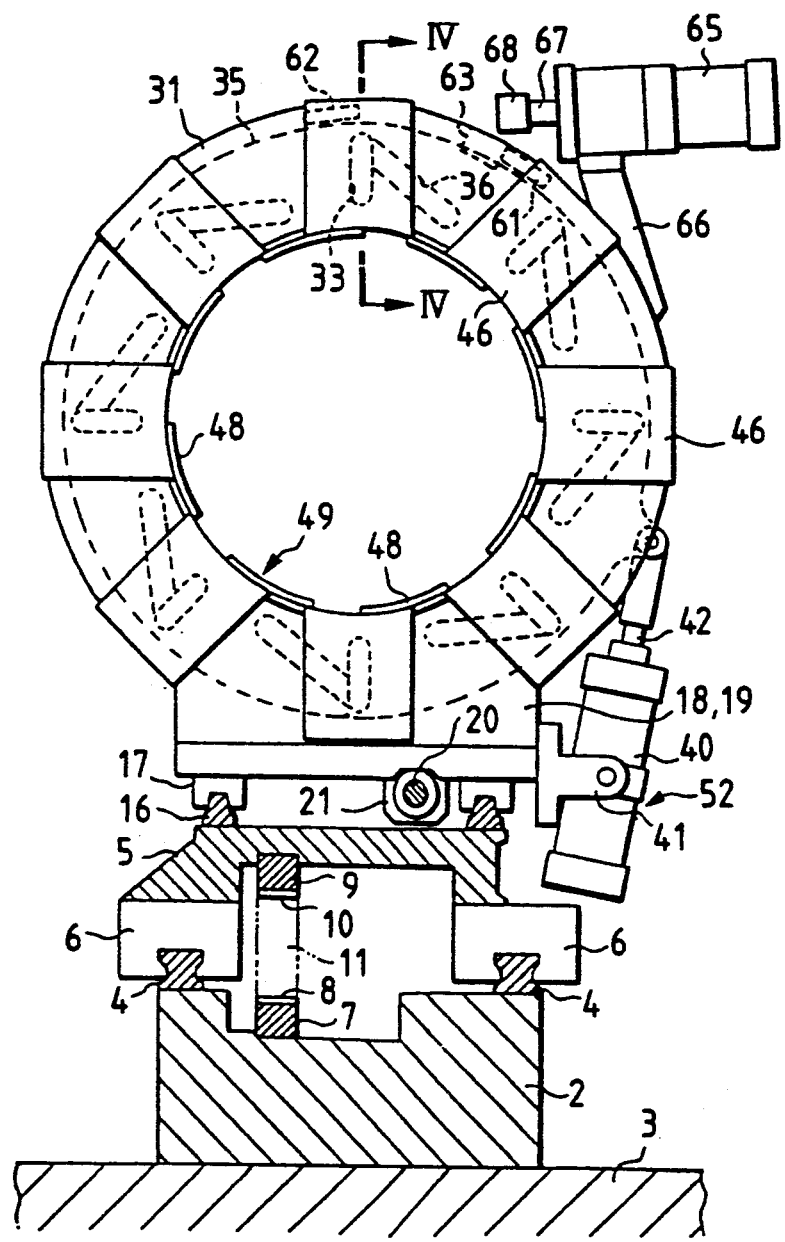
FIG. 2 is a sectional view of the apparatus along a line I—I shown in FIG. 1.
Figure 3:
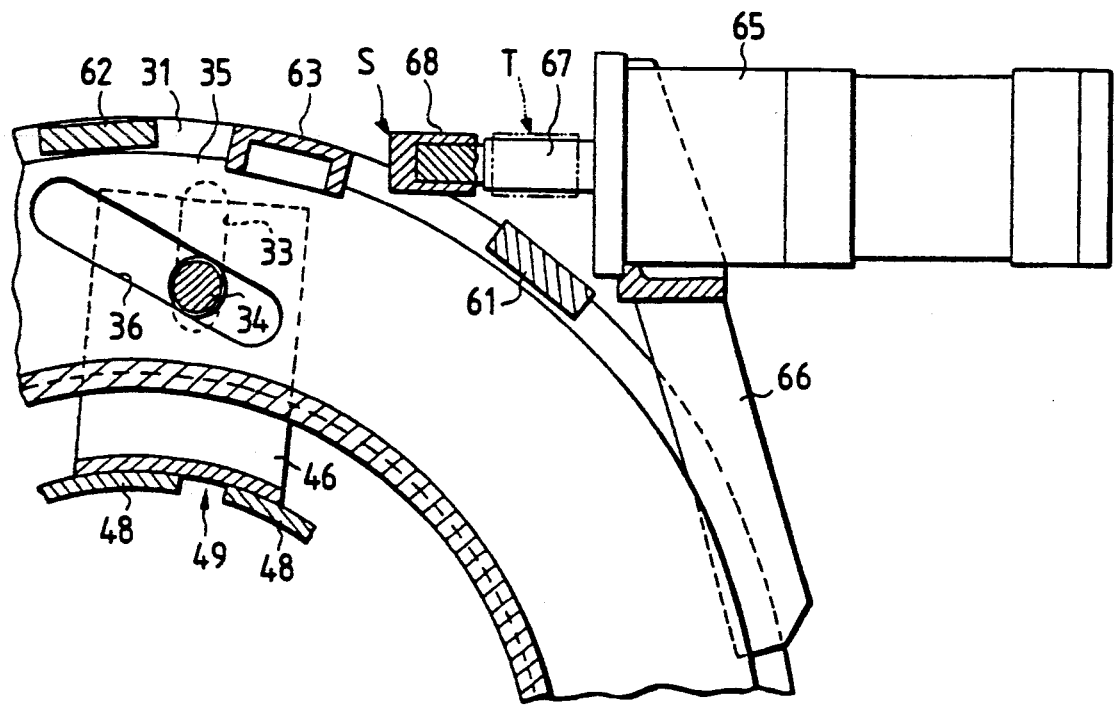
FIG. 3 is a sectional view of the apparatus along a line II—II shown in FIG. 1.

As shown in FIGS. 1, 2, 3 and 4, each of the stands 18 and 19 includes a pair of rings 31, and a cylindrical portion 32 coupling the radially inner edges of the rings to each other. Each of the rings 31 has a plurality of slender holes 33 extending slenderly in the radial direction of the ring both the ends of shafts 34 are inserted in the slender holes 33 of the rings 31 so that the shafts can be moved in the holes in the radial directions of the rings. A rotary plate 35 having the same number of slender holes 36 as those 33 of each ring 31 is rotatably supported around the cylindrical portion 32. The slender holes 36 extend obliquely to the radial direction of the rotary plate 35. Rollers 37 are mounted on the central portions of the shafts 34 and rotatably fitted in the slender holes 36. Cylinders 40 are coupled to the stands 18 and 19 and supported by brackets 41. The tips of the piston rods 42 of the cylinders 40 are connected to the rotary plates 35 of the stands 18 and 19. When the cylinders 40 are put in such action that the rotary plates 35 are turned relative to the rings 31, the shafts 34 are moved synchronously with each other in the radial directions of the rings 31 due to the wedge effects of the slender holes 33 and 36. The same number of arc-shaped segments 46 as the slender holes 33 of each ring 31 are fitted thereon from the radially inner edges thereof. Both the ends of the shafts 34 are secured to the segments 46. Permanent magnets 47, which hold the beads of the tire, are secured to the arc-shaped segments 46 at the radially inner edges thereof on the inner portions of the segments, which face each other in parallel with the axis of the rings 31. Arc-shaped plates 48 are secured at the butts thereof to the radially inner edges of the arc-shaped segments 46 and located in sliding contact with the radially inner edges of the adjacent arc-shaped segments at the tips of the plates. Cylindrical bodies 49 are composed of the arc-shaped plates 46, the permanent magnets 47 and the arc-shaped plate 48. Guide blocks 50 are secured to the sides of the arc-shaped segments 46, which face the rings 31. Guide bars 51, which extend nearly in the radial directions of the rings 31, are secured to the sides of the rings, which face the arc-shaped segments 46. Since the guide bars 51 are slidably fitted in the guide blocks 50, the arc-shaped segments 46 are supported by the stands 18 and 19 so that the segments can be moved in the radial directions of the rings 31. When the rotary plates 35 are turned relative to the rings 31, the segments 46 are moved synchronously with each other in the radial directions of the rings so that the diameters of the cylindrical bodies 49 are decreased. Diameter increase/decrease mechanisms 52 for increasing or decreasing the diameters of the cylindrical bodies 49 are composed of the slender holes 33 and 36, the shafts 34, the rotary plates 35 and the cylinders 40. A drive mechanism 53 for moving the cylindrical bodies 49 in parallel with the axis of the forming drum 1 is composed of the screw shaft 20, the screw blocks 21 and the motor 22. As shown in FIGS. 2 and 3, a maximum diameter stopper 61 and a minimum diameter stopper 62, which are blocks, are secured to the rings 31 of each of the stands 18 and 19 and disposed at a prescribed distance from each other in the circumferential direction of the ring. Dogs 63 are secured to the rotary plates 35, and disposed between the maximum and the minimum diameter stoppers 61 and 62. When the diameter increase/decrease mechanisms 52 are put in such action that each of the arc-shaped segments 46 is moved outward in the radial direction of the ring 31 by a prescribed quantity, the dog 63 comes into contact with the maximum diameter stopper 61 to restrict the outward movement of the segments in the radial direction of the ring so as to limit the diameter of each cylindrical body 49 to a maximum value. When the diameter increase/decrease mechanisms 52 are put in such action that each segment 46 is moved inward in the radial direction of the ring 31 by a prescribed quantity, the dog 63 comes into contact with the minimum diameter stopper 62 to restrict the inward movement of the segments in the radial direction of the ring so as to limit the diameter of the cylindrical body 49 to a minimum value. Cylinders 65 are secured as moving mechanisms with brackets 66 to the rings 31 near the maximum diameter stoppers 61. Intermediate diameter stoppers 68 are secured to the tips of the piston rods 67 of the cylinders 65. When the piston rod 67 of each of the cylinders 65 is protruded therefrom, the intermediate diameter stopper 68 is located in a restrictive position S in the movement passage for the dog 63 between the maximum and the minimum diameter stoppers 61 and 62 as shown by full lines in FIG. 3 When the piston rod 67 of each of the cylinders 65 is retracted thereto, the intermediate diameter stopper 68 is located in a put-aside position T off the movement passage for the dog 63 as shown by a dotted line in FIG. 3. In other wards, the intermediate diameter stopper 68 is moved between the restrictive position S for restricting the movement of the arc-shaped segments 46, and the put-aside position T for not restricting the movement of the segments, depending on the operation of the cylinder 65. When each diameter increase/decrease mechanism 52 is put in such action that the arc-shaped segments 46 are moved outward in the radial direction of the ring 31 as the intermediate diameter stopper 68 is in the restrictive position S, the dog 63 comes in to contact with the stopper to restrict the outward movement of the segments in the radial direction of the ring so as to limit the diameter of the cylindrical body 49 to an intermediate value between the maximum and the minimum values.

Figure 4A:
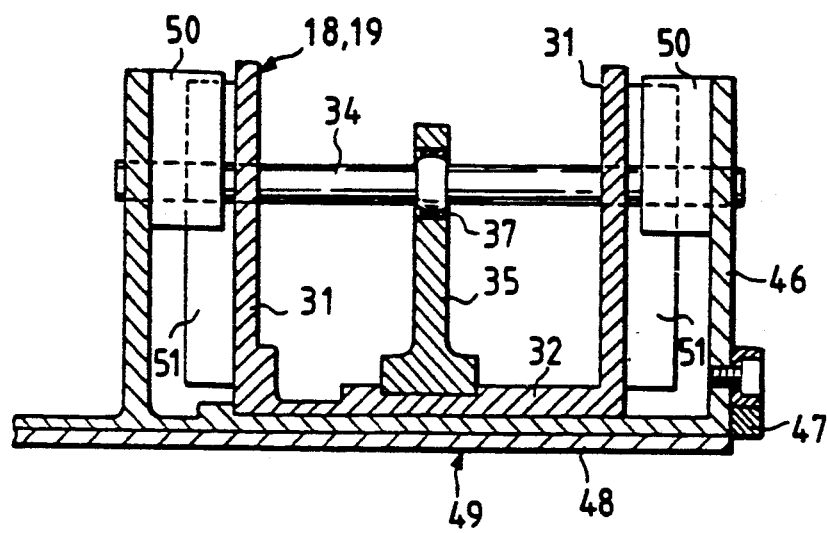
FIG. 4 is a sectional view of the apparatus along a line IV—IV shown in FIG. 2.
Figure 4B:
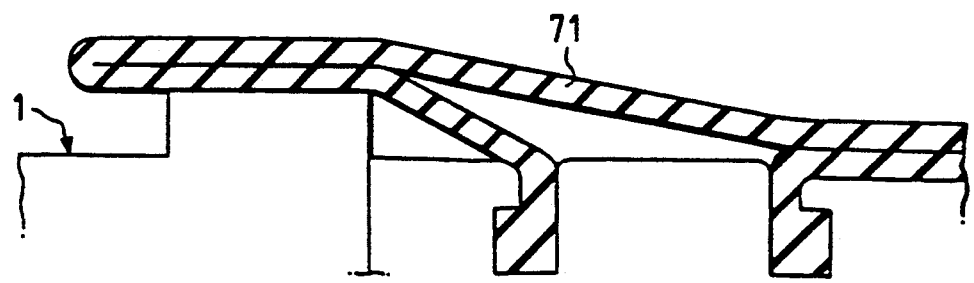

As shown in FIGS. 1 and 4, inflatable and deflatable bladders 71 are provided at both the ends of the forming drum in such a manner that the butts of the bladders are hermetically secured to the body of the forming drum.

Figure 5A:
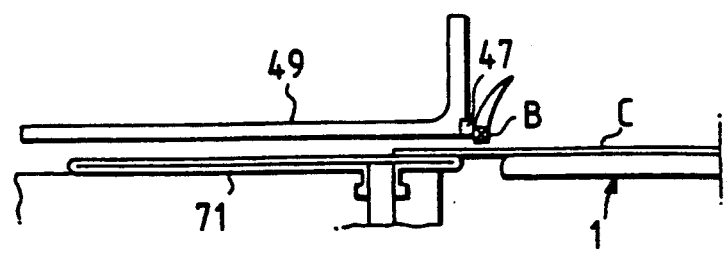
FIGS. 5A, 5B, 5C, 5D and 5E are explanatory views for describing the operation of the apparatus.

The operation of the apparatus in the method is described in detail from now on. The tire component C such as a carcass ply is first wound on the outside circumferential surface of the forming drum 1 as shown in FIG. 5A. At that time, the movable frame 5 is in a stand-by position away from the forming drum 1, the stands 18 and 19 are away from each other as shown in FIG. 1, the bladders 71 remain flatly deflated as shown in FIG. 1, and the cylindrical bodies 49 are in stand-by states with the maximum diameters thereof as shown in FIG. 4. The cylinders 40 of the diameter increase/decrease mechanisms 52 are then put in such action as to protrude the piston rods 42 of the cylinders therefrom to turn the rotary plates 35. As a result, the shafts 34 and the arc-shaped segments 46 are moved synchronously with each other inward in the radial directions of the rings 31 due to the wedge effects of the slender holes 33 and 36 so that the diameters of the cylindrical bodies 49 are decreased. When the dogs 63 have then come into contact with the minimum diameter stoppers 62 too hinder the turning of the rotary plates 35, the movement of the segments 46 is stopped so that the diameters of the cylindrical bodies 49 are decreased to the minimum value. The beads B furnished with fillers are then attracted on the permanent magnets 47 of the cylindrical bodies 49. The cylinder 40 is thereafter put in such action that the piston rod 42 thereof is retracted to move the frame 5 to cause the cylindrical bodies 49 to surround the forming drum 1 at both the ends thereof.

Figure 5B:
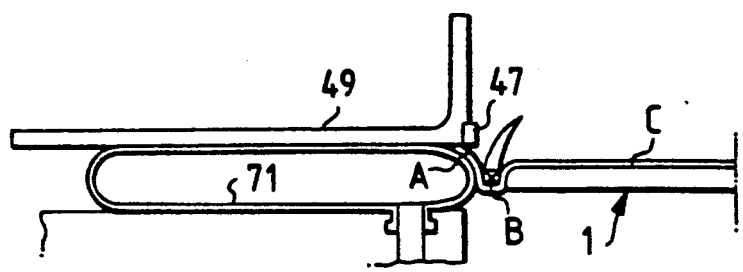

After that, the diameter of the forming drum 1 is increased so that the beads B are set in prescribed positions on the tire component C at both the side edges thereof, as shown in FIG. 5B. The portions A of the tire component C, which extend from the set positions of the beads B to the side edges of the tire component, are to be bent back by the apparatus in the method. The piston rods 67 of the cylinders 65 are then protruded so that the intermediate diameter stoppers 68 are moved from the put-aside positions T to the restrictive positions S. The cylinders 40 of the diameter increase/decrease mechanisms 52 are then put in such action that the piston rods 42 of the cylinders are retracted to move the arc-shaped segments 46 outward in the radial directions of the rings 31. The movement of the segments 46 is stopped when the dogs 63 have come into contact with the intermediate diameter stoppers 68 in the restrictive positions S so that the movement of the dogs is hindered. At that time, the diameters of the cylindrical bodies 49 are increased to the intermediate value. The motor 22 of the drive mechanism 53 is thereafter put in action to rotate the screw shaft 20 to slightly move the stands 18 and 19 away from each other. Air is then introduced, under low pressure, into the bladders 71 to inflate them. As a result, the portions A of the tire component C are gradually pushed and spread as a whole while receiving tensile forces, so that both the side edges of the tire component are moved toward the cylindrical bodies 49. At that time, since the diameters of the cylindrical bodies 49 are at the intermediate value, both the side edges of the tire component C are securely pinch-held between the cylindrical bodies 49 and the bladders 71 even if the length of each of the portions A of the tire component is relatively small.

Figure 5C:
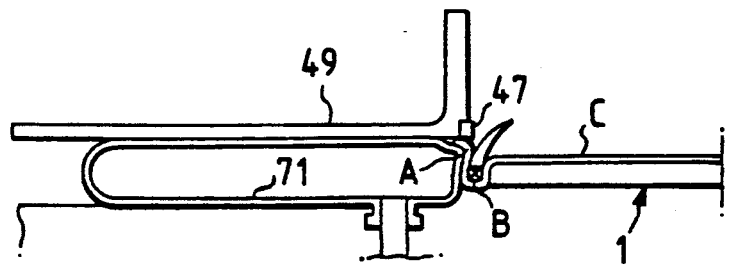

Then, the motor 22 of the drive mechanism 53 is actuated to turn the rotary shaft 20 to move the stands 18 and 19 toward each other, as shown in FIG. 5C. As a result, the cylindrical bodies 49 are moved to positions located nearly outside the beads B in the radial directions of the rings 31, as the side edges of the tire component C remain pinch-held between the cylindrical bodies and the bladders 71. The portions A of the tire component C are thus bent outward in the radial directions of the rings 31 as the portions A remain in strong pressure contact with the beads B. For that reason, the quality of the bending-back of the portions A of the tire component C is made high.

Figure 5D:
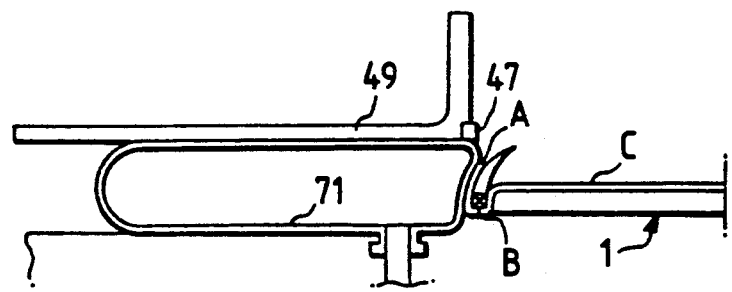

After that, the piston rods 67 of the cylinders 65 are retracted to move the intermediate diameter stoppers 68 from the restrictive positions C to the put-aside positions T to cease hindering the movement of the dogs 63, as shown in FIG. 5D. The cylinders 40 of the diameter increase/decrease mechanisms 52 are then put in such action that the pinion rods 42 of the cylinders 40 are retracted to move the arc-shaped segments 46 further outward in the radial directions of the rings 31. The movement of the segments 46 is stopped when the dogs 63 have come into contact with the maximum diameter stoppers 61 so as to be hindered from moving. At that time, the diameters of the cylindrical bodies 49 are increased to the maximum value so that spaces, into which the bladders 71 are moved, are defined between the tire component C and the cylindrical bodies. At the same time, both the side edges of the tire component C go out from between the cylindrical bodies 49 and the bladders 71 but the portions A of the component remain strongly pushed onto the beads B by the bladders 71, to that the bent states of the portions A are hardly changed.

Figure 5E:
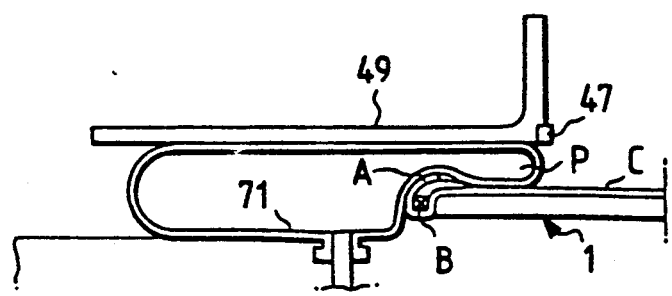

After that, the motor 22 of the drive mechanism 53 is driven to rotate the screw shaft 20 to move the stands 18 and 19 toward each other to displace the cylindrical bodies 49 toward the longitudinally central portion of the forming drum 1, as shown in FIG. 5E. At that time, since the bladders 71 are in tight contact with the inside surfaces of the cylindrical bodies 49 so as not to slip relative thereto, the bladders are deformed while partly rolling toward the longitudinally central portion of the forming drum 1, so that the portions A of the tire component C are bent back around the beads B. When the cylindrical bodies 49 are moved further toward the longitudinally central portion of the forming drum 1, the bladders 71 are deformed further into narrow spaces P between the tire component C and the cylindrical bodies so that the portions A of the tire component are bent back further. After the portions A are thus bent back to the full by the forming drum 1, the cylindrical bodies 49 and the bladders 71, the motor 22 is stopped. The air is then discharged from the bladders 71. The bladders 71 are moved out from between the tire component C and the cylindrical bodies 49 and returned to the original flat states thereof. The motor 22 is then driven so that the stands 18 and 19 are returned to the original positions thereof. The tire component C is removed from the forming drum 1, and sent to the forming drum for performing the second-stage formation of the tire.

If the length of each of the portions A of the tire component C is relatively large, the portions are bent back as the intermediated diameter stoppers 68 remain maintained in the put-aside positions T. For that reason, even if the length of each of the portions A varies, the length can be well handled through only the operation of the cylinders 65.

According to the present invention, the quality of the beading-back of the portions of the fire component is made high even if the length of each of the portions is relatively small.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the ture spirit and scope of the invention.

What is claimed is:

1. A method of bending back a tire component comprising practicing the following sequential order of steps:

providing a pair of cylindrical bodies whose diameters can be increased and decreased, decreasing the diameters of said cylindrical bodies to a minimum value to hold beads by said bodies, respectively, and said beads being set in prescribed positions on said tire component wound on a forming drum;

increasing the diameters of said bodies to an intermediate value and inflating bladders of said drum so that said component is pinch-held at both the side edges thereof between said bladders and said bodies;

moving said bodies axially to positions located nearly outside said beads in the radially directions of said bodies, so that both the side edges of said tire component are moved upward in the radial directions of said bodies as said tire component remains in pressure contact with said beads near said side edges; and increasing the diameters of said bodies to a maximum value wherein said edges of said tire component are released from between said cylindrical bodies and said bladders and are completely attached to said beads and, moving said bodies toward the longitudinally central portion of said drum so that said component is bent back at both the side edges thereof around said beads by said bodies, said bladders and the body of said drum.

2. An apparatus for bending back a tire component including a pair of cylindrical bodies, each of which comprising:
- a plurality of arc-shaped segments and holding portions which are located at the mutually-opposed longitudinally inner ends of said bodies and can hold beads;
- diameter increase/decrease means for moving said segments synchronously with each other in the radial directions of said bodies so as to increase or decrease the diameters of said cylindrical bodies;
- maximum diameter stopper means for restricting the outward movement of said segments in said radial directions so as to limit the diameters of said bodies to a maximum value;
- minimum diameter stopper means for restricting the inward movement of said segments in said radial directions so as to limit the diameters of said bodies to a minimum value;
- a drive means for moving said bodies in the axial direction of a forming drum;
- bladders mechanism provided at both the longitudinal ends of said drum and capable of being inflated and deflated;
- intermediate diameter stopper means for restricting the outward movement of said segments in said radial directions so as to limit the diameters of said bodies to an intermediate value between said maximum value and said minimum value; had
- moving means for moving said intermediate diameter stoppers between restrictive positions for restricting the movement of said segments, and put-aside positions for not restricting the movement of said segments.

3. An apparatus according to claim 2, in which said moving means comprising a cylinder having a reciprocating piston.

4. An apparatus according to claim 3, in which said intermediate diameter stopper means are secured to the tip of the piston of said moving means.

5. An apparatus according to claim 4, in which dog is secured to said diameter increase/decrease mechanisms, and is disposed between the maximum and the minimum diameter stopper means.

6. An apparatus according to claim 5, in which said dog comes in to contact with said intermediate stopper means to restrict the outward movement of said segments in the radial direction so as to limit the diameter of said cylindrical body to the intermediate value between the maximum and the minimum values.

* * * * *